United States Patent
Peng

(10) Patent No.: US 11,620,072 B2
(45) Date of Patent: Apr. 4, 2023

(54) MEMORY MANAGEMENT METHOD, MEMORY CONTROL CIRCUIT UNIT AND MEMORY STORAGE APPARATUS

(71) Applicant: Hefei Core Storage Electronic Limited, Anhui Province (CN)

(72) Inventor: Chong Peng, Anhui Province (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 17/308,069

(22) Filed: May 5, 2021

(65) Prior Publication Data

US 2022/0326871 A1 Oct. 13, 2022

(30) Foreign Application Priority Data

Apr. 12, 2021 (CN) .......................... 202110391156.7

(51) Int. Cl.
*G06F 3/06* (2006.01)
(52) U.S. Cl.
CPC ............ *G06F 3/0652* (2013.01); *G06F 3/064* (2013.01); *G06F 3/065* (2013.01); *G06F 3/0619* (2013.01); *G06F 3/0665* (2013.01); *G06F 3/0679* (2013.01)
(58) Field of Classification Search
CPC ...... G06F 3/0652; G06F 3/0619; G06F 3/064; G06F 3/065; G06F 3/0665; G06F 3/0679
See application file for complete search history.

(56) References Cited

U.S. PATENT DOCUMENTS

| 10,061,710 | B2 | 8/2018 | Kawamura et al. |
| 10,445,229 | B1 * | 10/2019 | Kuzmin .................. G06F 8/654 |
| 2019/0065097 | A1 * | 2/2019 | Liu ........................ G06F 3/0679 |
| 2019/0220396 | A1 * | 7/2019 | Lin ....................... G06F 12/1009 |
| 2019/0332331 | A1 * | 10/2019 | Hsieh ................... G06F 3/0688 |
| 2019/0347192 | A1 * | 11/2019 | Hsiao ................... G06F 3/0679 |

(Continued)

FOREIGN PATENT DOCUMENTS

| CN | 110471612 | 11/2019 |
| CN | 107590080 | 10/2020 |

(Continued)

OTHER PUBLICATIONS

"Notice of allowance of Taiwan Counterpart Application", dated May 31, 2022, p. 1-p. 5.

*Primary Examiner* — Eric Cardwell
(74) *Attorney, Agent, or Firm* — JCIPRNET

(57) ABSTRACT

A memory management method, a memory control circuit unit and a memory storage apparatus are provided. The method includes: recording a valid count of each physical erasing unit in a plurality of physical erasing units; sequentially arranging M physical erasing units corresponding to each of chip enable groups according to the valid count to form a plurality of sorted physical erasing units; remapping the physical erasing units corresponding to M virtual blocks according to the plurality of sorted physical erasing units; calculating a total number of valid counts of the remapped M virtual blocks, and sequentially arranging the remapped M virtual blocks according to the total number of valid counts to form a plurality of sorted virtual blocks; and sequentially extracting at least one of the sorted virtual blocks as a source virtual block to perform a garbage collection operation.

18 Claims, 7 Drawing Sheets

(56) References Cited

U.S. PATENT DOCUMENTS

| | | | |
|---|---|---|---|
| 2020/0042441 A1* | 2/2020 | Hsiao | G06F 3/0608 |
| 2020/0081833 A1* | 3/2020 | Lee | G06F 12/10 |
| 2022/0100650 A1* | 3/2022 | Lai | G06F 12/0246 |

FOREIGN PATENT DOCUMENTS

| | | |
|---|---|---|
| TW | I661299 | 6/2019 |
| TW | I664528 | 7/2019 |

\* cited by examiner

FIG. 4

| | CE(0) | CE(1) | CE(2) | CE(3) | CE(4) | CE(5) | CE(6) | CE(7) |
|---|---|---|---|---|---|---|---|---|
| VB0 | Physical erasing unit 410(0) | Physical erasing unit 420(0) | Physical erasing unit 430(0) | Physical erasing unit 440(0) | Physical erasing unit 450(0) | Physical erasing unit 460(0) | Physical erasing unit 470(0) | Physical erasing unit 480(0) |
| VB1 | Physical erasing unit 410(1) | Physical erasing unit 420(1) | Physical erasing unit 430(1) | Physical erasing unit 440(1) | Physical erasing unit 450(1) | Physical erasing unit 460(1) | Physical erasing unit 470(1) | Physical erasing unit 480(1) |
| VB2 | Physical erasing unit 410(2) | Physical erasing unit 420(2) | Physical erasing unit 430(2) | Physical erasing unit 440(2) | Physical erasing unit 450(2) | Physical erasing unit 460(2) | Physical erasing unit 470(2) | Physical erasing unit 480(2) |
| VB3 | Physical erasing unit 410(3) | Physical erasing unit 420(3) | Physical erasing unit 430(3) | Physical erasing unit 440(3) | Physical erasing unit 450(3) | Physical erasing unit 460(3) | Physical erasing unit 470(3) | Physical erasing unit 480(3) |
| VB4 | Physical erasing unit 410(4) | Physical erasing unit 420(4) | Physical erasing unit 430(4) | Physical erasing unit 440(4) | Physical erasing unit 450(4) | Physical erasing unit 460(4) | Physical erasing unit 470(4) | Physical erasing unit 480(4) |
| VB5 | Physical erasing unit 410(5) | Physical erasing unit 420(5) | Physical erasing unit 430(5) | Physical erasing unit 440(5) | Physical erasing unit 450(5) | Physical erasing unit 460(5) | Physical erasing unit 470(5) | Physical erasing unit 480(5) |
| VB6 | Physical erasing unit 410(6) | Physical erasing unit 420(6) | Physical erasing unit 430(6) | Physical erasing unit 440(6) | Physical erasing unit 450(6) | Physical erasing unit 460(6) | Physical erasing unit 470(6) | Physical erasing unit 480(6) |
| VB7 | Physical erasing unit 410(7) | Physical erasing unit 420(7) | Physical erasing unit 430(7) | Physical erasing unit 440(7) | Physical erasing unit 450(7) | Physical erasing unit 460(7) | Physical erasing unit 470(7) | Physical erasing unit 480(7) |
| VB8 | Physical erasing unit 410(8) | Physical erasing unit 420(8) | Physical erasing unit 430(8) | Physical erasing unit 440(8) | Physical erasing unit 450(8) | Physical erasing unit 460(8) | Physical erasing unit 470(8) | Physical erasing unit 480(8) |
| VB9 | Physical erasing unit 410(9) | Physical erasing unit 420(9) | Physical erasing unit 430(9) | Physical erasing unit 440(9) | Physical erasing unit 450(9) | Physical erasing unit 460(9) | Physical erasing unit 470(9) | Physical erasing unit 480(9) |
| VB10 | Physical erasing unit 410(10) | Physical erasing unit 420(10) | Physical erasing unit 430(10) | Physical erasing unit 440(10) | Physical erasing unit 450(10) | Physical erasing unit 460(10) | Physical erasing unit 470(10) | Physical erasing unit 480(10) |

First order →

123

| | CE(0) | CE(1) | CE(2) | CE(3) | CE(4) | CE(5) | CE(6) | CE(7) |
|---|---|---|---|---|---|---|---|---|
| VB0 | 410(0) | 420(0) | 430(0) | 440(0) | 450(0) | 460(0) | 470(0) | 480(0) |
| VB1 | 410(1) | 420(1) | 430(1) | 440(1) | 450(1) | 460(1) | 470(1) | 480(1) |
| VB2 | 410(2) | 420(2) | 430(2) | 440(2) | 450(2) | 460(2) | 470(2) | 480(2) |
| VB3 | 410(3) | 420(3) | 430(3) | 440(3) | 450(3) | 460(3) | 470(3) | 480(3) |
| VB4 | 410(4) | 420(4) | 430(4) | 440(4) | 450(4) | 460(4) | 470(4) | 480(4) |
| VB5 | 410(5) | 420(5) | 430(5) | 440(5) | 450(5) | 460(5) | 470(5) | 480(5) |
| VB6 | 410(6) | 420(6) | 430(6) | 440(6) | 450(6) | 460(6) | 470(6) | 480(6) |
| VB7 | 410(7) | 420(7) | 430(7) | 440(7) | 450(7) | 460(7) | 470(7) | 480(7) |
| VB8 | 410(8) | 420(8) | 430(8) | 440(8) | 450(8) | 460(8) | 470(8) | 480(8) |
| VB9 | 410(9) | 420(9) | 430(9) | 440(9) | 450(9) | 460(9) | 470(9) | 480(9) |
| VB10 | 410(10) | 420(10) | 430(10) | 440(10) | 450(10) | 460(10) | 470(10) | 480(10) |

FIG. 5A

|  | CE(0) | CE(1) | CE(2) | CE(3) | CE(4) | CE(5) | CE(6) | CE(7) |
|---|---|---|---|---|---|---|---|---|
| VB0 | 410(0)→410(4) | 420(0)→420(6) | 430(0)→430(5) | 440(0)→440(10) | 450(0)→450(7) | 460(0)→460(3) | 470(0)→470(5) | 480(0)→480(10) |
| VB1 | 410(1)→410(10) | 420(1)→420(3) | 430(1)→430(6) | 440(1)→440(9) | 450(1)→450(3) | 460(1)→460(4) | 470(1)→470(8) | 480(1)→480(5) |
| VB2 | 410(2) | 420(2)→420(1) | 430(2)→430(8) | 440(2)→440(7) | 450(2) | 460(2)→460(0) | 470(2)→470(9) | 480(2)→480(3) |
| VB3 | 410(3)→410(7) | 420(3)→420(7) | 430(3)→430(9) | 440(3)→440(1) | 450(3)→450(9) | 460(3)→460(5) | 470(3)→470(0) | 480(3)→480(9) |
| VB4 | 410(4)→410(5) | 420(4)→420(5) | 430(4)→430(3) | 440(4)→440(3) | 450(4)→450(8) | 460(4)→460(7) | 470(4)→470(6) | 480(4)→480(0) |
| VB5 | 410(5)→410(8) | 420(5)→420(8) | 430(5)→430(2) | 440(5) | 450(5)→450(10) | 460(5)→460(2) | 470(5)→470(10) | 480(5)→480(2) |
| VB6 | 410(6)→410(9) | 420(6)→420(2) | 430(6)→430(1) | 440(6)→440(0) | 450(6)→450(4) | 460(6)→460(10) | 470(6)→470(2) | 480(6) |
| VB7 | 410(7)→410(0) | 420(7)→420(4) | 430(7)→430(10) | 440(7)→440(4) | 450(7)→450(6) | 460(7)→460(1) | 470(7) | 480(7)→480(4) |
| VB8 | 410(8)→410(3) | 420(8)→420(9) | 430(8)→430(0) | 440(8)→440(2) | 450(8)→450(5) | 460(8)→460(6) | 470(8)→470(3) | 480(8)→480(1) |
| VB9 | 410(9)→410(1) | 420(9)→420(10) | 430(9)→430(7) | 440(9)→440(8) | 450(9)→450(1) | 460(9)→460(8) | 470(9)→470(1) | 480(9)→480(8) |
| VB10 | 410(10)→410(6) | 420(10)→420(0) | 430(10)→430(4) | 440(10)→440(6) | 450(10)→450(0) | 460(10)→460(9) | 470(10)→470(4) | 480(10)→480(7) |

FIG. 5B

MEMORY MANAGEMENT METHOD, MEMORY CONTROL CIRCUIT UNIT AND MEMORY STORAGE APPARATUS

CROSS-REFERENCE TO RELATED APPLICATION

This application claims the priority benefit of China application serial no. 202110391156.7, filed on Apr. 12, 2021. The entirety of the above-mentioned patent application is hereby incorporated by reference herein and made a part of this specification.

BACKGROUND

Technical Field

The disclosure relates to a memory management technology, and particularly relates to a memory management method, a memory control circuit unit and a memory storage apparatus.

Description of Related Art

Digital cameras, cell phones, and MP3 players have undergone rapid growth in recent years, so that consumer demands for storage media have also rapidly increased. Since a rewritable non-volatile memory module (for example, a flash memory) has characteristics of data non-volatility, low power consumption, small volume, non-mechanical structure, etc., it is suitable for being built in the various portable multimedia devices mentioned above.

In order to increase the maximum speed (i.e., a bandwidth) of memory storage apparatuses, most of today's memory storage apparatuses adopt a multi-channel design. Each channel may be connected to a plurality of chip enable groups. Physical erasing units (blocks) that belong to different channels and have different block planes may form a virtual block. Generally, the memory storage apparatus may store old data in the virtual blocks in a centralized manner through a data merging operation (such as a garbage collection operation) and release new idle virtual blocks. The new idle virtual blocks may be used to store new data from a host system. However, if the valid data of the virtual blocks is centralized in a few chip enable groups, the performance of the data merging operation may be reduced.

SUMMARY

The invention is directed to a memory management method, a memory control circuit unit and a memory storage apparatus, which are adapted to improve a sustained performance of a memory.

An exemplary embodiment of the invention provides a memory management method adapted to a rewritable non-volatile memory module. The rewritable non-volatile memory module includes a plurality of physical erasing units, wherein each of the plurality of physical erasing units corresponds to a chip enable group. In addition, the chip enable group has M physical erasing units corresponding to M virtual blocks arranged according to a first order. The memory management method includes: recording a valid count of each of the plurality of physical erasing units; sequentially arranging the M physical erasing units corresponding to each of the chip enable groups according to the valid count to form a plurality of sorted physical erasing units; remapping the physical erasing units corresponding to the M virtual blocks according to the plurality of sorted physical erasing units; calculating a total number of valid counts of the remapped M virtual blocks, and sequentially arranging the remapped M virtual blocks according to the total number of valid counts to form a plurality of sorted virtual blocks; and sequentially extracting at least one of the sorted virtual blocks as a source virtual block to perform a garbage collection operation.

In an exemplary embodiment of the invention, the step of sequentially arranging the M physical erasing units corresponding to each of the chip enable groups according to the valid count to form the plurality of sorted physical erasing units includes: sorting the M physical erasing units corresponding to each of the chip enable groups in an ascending order according to the valid count to form the plurality of sorted physical erasing units.

In an exemplary embodiment of the invention, the step of sequentially arranging the remapped M virtual blocks according to the total number of valid counts to form the plurality of sorted virtual blocks includes: sorting the remapped M virtual blocks in an ascending order according to the total number of valid counts to form the plurality of sorted virtual blocks.

In an exemplary embodiment of the invention, the step of sequentially extracting at least one of the sorted virtual blocks as the source virtual block to perform the garbage collection operation includes: extracting at least one of the sorted virtual blocks sorted to the front as the source virtual block to perform the garbage collection operation.

In an exemplary embodiment of the invention, the step of sequentially extracting at least one of the sorted virtual blocks as the source virtual block to perform the garbage collection operation includes: extracting the sorted virtual block corresponding to a smallest total number of valid counts from the at least one of the sorted virtual blocks as the source virtual block.

In an exemplary embodiment of the invention, the step of performing the garbage collection operation includes: copying valid data in the source virtual block to a target virtual block, and erasing the source virtual block.

An exemplary embodiment of the invention provides a memory control circuit unit adapted to control a rewritable non-volatile memory module, wherein the rewritable non-volatile memory module includes a plurality of physical erasing units, wherein each of the plurality of physical erasing units corresponds to a chip enable group, and the chip enable group has M physical erasing units corresponding to M virtual blocks arranged according to a first order. The memory control circuit unit includes a host interface, a memory interface, and a memory management circuit. The host interface is coupled to a host system. The memory interface is coupled to the rewritable non-volatile memory module. The memory management circuit is coupled to the host interface and the memory interface. The memory management circuit is configured to record a valid count of each of the plurality of physical erasing units. The memory management circuit is further configured to sequentially arrange M physical erasing units corresponding to each of the chip enable groups according to the valid count to form a plurality of sorted physical erasing units. The memory management circuit is further configured to remap the physical erasing units corresponding to the M virtual blocks according to the plurality of sorted physical erasing units. The memory management circuit is further configured to calculate a total number of valid counts of the remapped M virtual blocks, and sequentially arrange the remapped M virtual blocks according to the total number of valid counts to form a plurality of sorted virtual blocks. Moreover, the memory management circuit is further configured to sequentially extract at least one of the sorted virtual blocks as a source virtual block to perform a garbage collection operation.

In an exemplary embodiment of the invention, the operation of sequentially arranging the M physical erasing units corresponding to each of the chip enable groups according to the valid count to form the plurality of sorted physical erasing units includes: sorting the M physical erasing units corresponding to each of the chip enable groups in an ascending order according to the valid count to form the plurality of sorted physical erasing units.

In an exemplary embodiment of the invention, the operation of sequentially arranging the remapped M virtual blocks according to the total number of valid counts to form the plurality of sorted virtual blocks includes: sorting the remapped M virtual blocks in an ascending order according to the total number of valid counts to form the plurality of sorted virtual blocks.

In an exemplary embodiment of the invention, the operation of sequentially extracting at least one of the sorted virtual blocks as the source virtual block to perform the garbage collection operation includes: extracting at least one of the sorted virtual blocks sorted to the front as the source virtual block to perform the garbage collection operation.

In an exemplary embodiment of the invention, the operation of sequentially extracting at least one of the sorted virtual blocks as the source virtual block to perform the garbage collection operation includes: extracting the sorted virtual block corresponding to a smallest total number of valid counts from the at least one of the sorted virtual blocks as the source virtual block.

In an exemplary embodiment of the invention, the operation of performing the garbage collection operation includes: copying valid data in the source virtual block to a target virtual block, and erasing the source virtual block.

An exemplary embodiment of the invention provides a memory storage apparatus including a connection interface unit, a rewritable non-volatile memory module and a memory control circuit unit. The connection interface unit is coupled to a host system. The rewritable non-volatile memory module includes a plurality of physical erasing units, wherein each of the plurality of physical erasing units corresponds to a chip enable group, and the chip enable group has M physical erasing units corresponding to M virtual blocks arranged according to a first order. The memory control circuit unit is coupled to the connection interface unit and the rewritable non-volatile memory module. The memory control circuit unit is configured to record a valid count of each of the plurality of physical erasing units. The memory control circuit unit is further configured to sequentially arrange the M physical erasing units corresponding to each of the chip enable groups according to the valid count to form a plurality of sorted physical erasing units. The memory control circuit unit is further configured to remap the physical erasing units corresponding to the M virtual blocks according to the plurality of sorted physical erasing units. The memory control circuit unit is further configured to calculate a total number of valid counts of the remapped M virtual blocks, and sequentially arrange the remapped M virtual blocks according to the total number of valid counts to form a plurality of sorted virtual blocks. Moreover, the memory control circuit unit is further configured to sequentially extract at least one of the sorted virtual blocks as a source virtual block to perform a garbage collection operation.

In an exemplary embodiment of the invention, the operation of sequentially arranging the M physical erasing units corresponding to each of the chip enable groups according to the valid count to form the plurality of sorted physical erasing units includes: sorting the M physical erasing units corresponding to each of the chip enable groups in an ascending order according to the valid count to form the plurality of sorted physical erasing units.

In an exemplary embodiment of the invention, the operation of sequentially arranging the remapped M virtual blocks according to the total number of valid counts to form the plurality of sorted virtual blocks includes: sorting the remapped M virtual blocks in an ascending order according to the total number of valid counts to form the plurality of sorted virtual blocks.

In an exemplary embodiment of the invention, the operation of sequentially extracting at least one of the sorted virtual blocks as the source virtual block to perform the garbage collection operation includes: extracting at least one of the sorted virtual blocks sorted to the front as the source virtual block to perform the garbage collection operation.

In an exemplary embodiment of the invention, the operation of sequentially extracting at least one of the sorted virtual blocks as the source virtual block to perform the garbage collection operation includes: extracting the sorted virtual block corresponding to a smallest total number of valid counts from the at least one of the sorted virtual blocks as the source virtual block.

In an exemplary embodiment of the invention, the operation of performing the garbage collection operation includes: copying valid data in the source virtual block to a target virtual block, and erasing the source virtual block.

Based on the above description, the memory management method, the memory control circuit unit and the memory storage apparatus of the embodiments of the invention are adapted to record the valid count of each physical erasing unit, and may reorganize the virtual blocks according to the valid count of each physical erasing unit. For example, the physical erasing unit with the smallest valid count in each chip enable group may be reorganized to a same virtual block. According to the reorganization result, the reorganized virtual block may be selected as the source virtual block used in the garbage collection operation. In this way, the efficiency of the garbage collection operation is improved and the number of times of the garbage collection operations is reduced, thereby improving the sustained performance of the memory.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic diagram illustrating an example of managing virtual blocks according to an embodiment of the invention.

FIG. 5A is a schematic diagram illustrating an example of managing virtual blocks according to an embodiment of the invention.

FIG. 5B is a schematic diagram illustrating an example of a remapping physical erasing units according to an embodiment of the invention.

DESCRIPTION OF THE EMBODIMENTS

Figure 1:
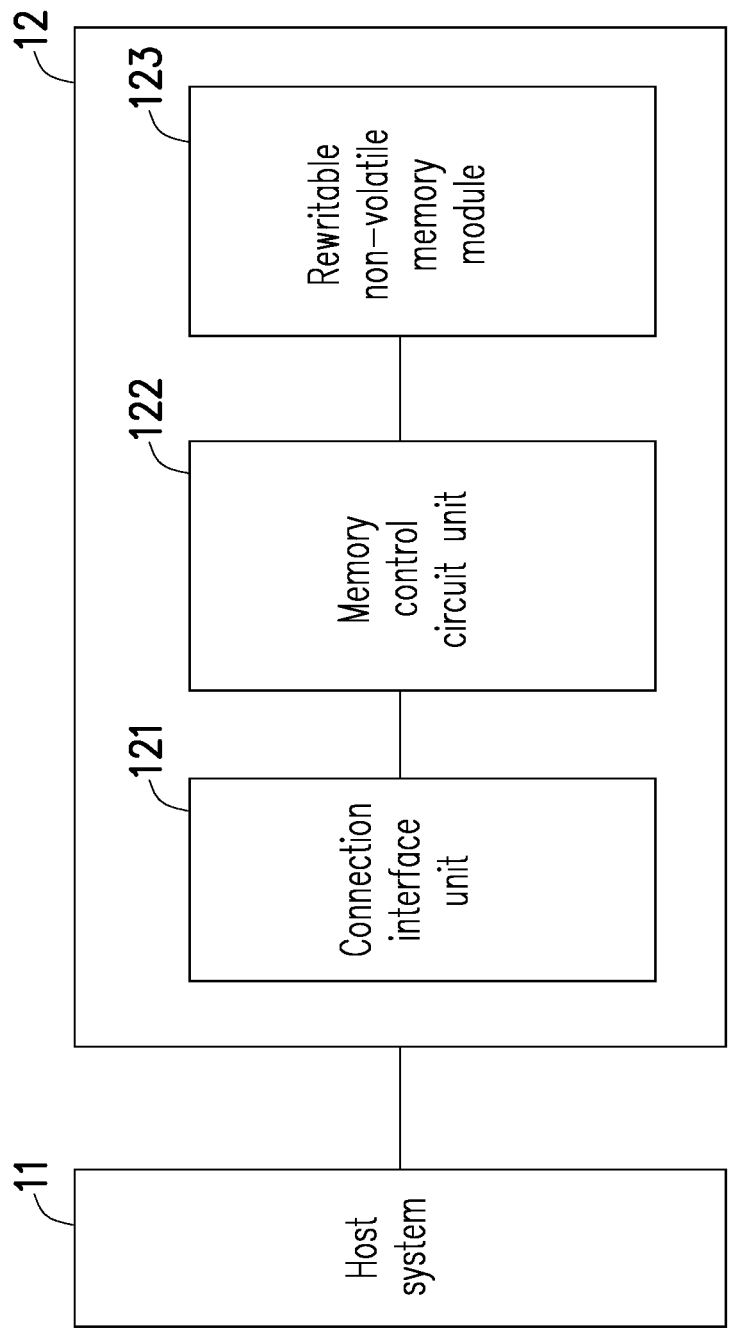
FIG. 1 is a schematic diagram of a memory storage system according to an embodiment of the invention.

FIG. 1 is a schematic diagram of a memory storage system according to an embodiment of the invention. Referring to FIG. 1, a memory storage system 10 includes a host system 11 and a memory storage apparatus 12. The host system 11 may be any type of a computer system. For example, the host system 11 may be a notebook computer, a desktop computer, a smart phone, a tablet computer, an industrial computer, a remote server, etc. The memory storage apparatus 12 is used to store data from the host system 11. For example, the memory storage apparatus 12 may be a flash drive, a memory card, a solid state drive (SSD) or other types of non-volatile memory storage apparatuses. The host system 11 may be electrically connected to the memory storage apparatus 12 and/or read data from the memory storage apparatus 12 through a serial advanced technology attachment (SATA) interface, a peripheral component interconnect express (PCI Express) interface, a universal serial bus (USB) standard or other types of connection interfaces.

The memory storage apparatus 12 may include a connection interface unit 121, a memory control circuit unit 122, and a rewritable non-volatile memory module 123. The connection interface unit 121 is used to connect the memory storage apparatus 12 to the host system 11. For example, the connection interface unit 121 is compatible to a connection interface standard such as SATA, PCI Express, or USB, etc. The memory storage apparatus 12 may communicate with the host system 11 via the connection interface unit 121. In an exemplary embodiment, the connection interface unit 121 and the memory control circuit unit 122 may be packaged in one chip, or the connection interface unit 121 may be arranged outside a chip including a memory control circuit unit, which is not limited by the invention.

The memory control circuit unit 122 is connected to the connection interface unit 121 and the rewritable non-volatile memory module 123. The memory control circuit unit 122 is used to execute a plurality of logic gates or control commands implemented in a hardware type or a firmware type, and perform data writing, reading, erasing operations, etc., in the rewritable non-volatile memory module 123 according to commands of the host system 11. For example, the memory control circuit unit 122 may include a central processing unit (CPU), a graphics processing unit (GPU), or other programmable general-purpose or special-purpose microprocessors, a digital signal processor (DSP), a programmable controller, an application specific integrated circuits (ASIC), a programmable logic device (PLD) or other similar devices or a combination of the above devices.

The rewritable non-volatile memory module 123 is coupled to the memory control circuit unit 122, and is used to store data written by the host system 11. The rewritable non-volatile memory module 123 includes memory cells, and the memory cells are arranged in an array. The memory cells of the rewritable non-volatile memory module 123 store data in the form of voltage. For example, the rewritable non-volatile memory module 123 may include a single level cell (SLC) NAND flash memory module (i.e., a flash memory module that one memory cell may store 1 data bit). However, the invention is not limited thereto, and the rewritable non-volatile memory module 123 may also be a multi-level cell (MLC) NAND flash memory module (i.e., a flash memory module that one memory cell may store 2 data bits), a trinary level cell (TLC) NAND flash memory module (i.e., a flash memory module that one memory cell may store 3 data bits) or other memory modules with similar characteristics.

In the exemplary embodiment, the rewritable non-volatile memory module 123 has a plurality of word lines, where each of the plurality of word lines includes a plurality of memory cells. The plurality of memory cells on a same word line form one or a plurality of physical programming units. For example, the physical programming unit may be a physical page or a physical sector. In addition, a plurality of the physical programming units may form one physical erasing unit. For example, the physical erasing unit may be a physical block.

In different exemplary embodiments, the physical erasing units may belong to a same memory die or belong to different memory dies. One physical erasing unit may be composed of a plurality of continuous or discontinuous physical addresses. Each physical erasing unit has a plurality of physical programming units, where the physical programming units belonging to the same physical erasing unit may be written independently and erased simultaneously. Each physical erasing unit may be composed of 64 physical programming units, 256 physical programming units, or any other number of physical programming units, which is not limited by the invention. In more detail, the physical erasing unit is the smallest unit for erasing data. Namely, each physical erasing unit contains the least number of memory cells that are erased all together. The physical programming unit is the smallest unit for programming data. Namely, physical programming unit is the smallest unit for writing data.

Figure 2:
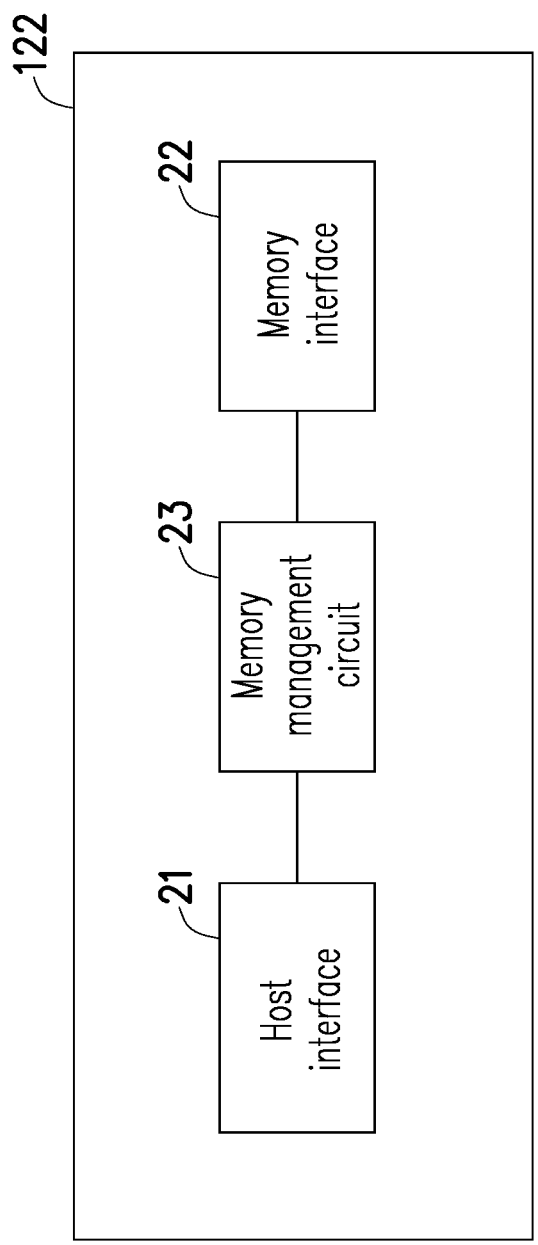
FIG. 2 is a schematic diagram of a memory control circuit unit according to an embodiment of the invention.

FIG. 2 is a schematic diagram of a memory control circuit unit according to an embodiment of the invention. Referring to FIG. 1 and FIG. 2, the memory control circuit unit 122 includes a host interface 21, a memory interface 22 and a memory management circuit 23.

The host interface 21 is coupled to the memory management circuit 23 and used for coupling to the connection interface unit 121 to receive and identify commands and data sent by the host system 11. In other words, the commands and data sent by the host system 11 may be sent to the memory management circuit 23 through the host interface 21. In the exemplary embodiment, the host interface 21 is compatible with the SATA standard. However, it must be understood that the invention is not limited thereto, and the host interface 21 may also be compatible with a PATA standard, an IEEE 1394 standard, a PCI Express standard, a USB standard, a UHS-I interface standard, a UHS-II interface standard, an SD standard, an MS standard, an MMC standard, a CF standard, an IDE standard or other suitable data transmission standards.

The memory interface 22 is coupled to the memory management circuit 23 and used to access the rewritable non-volatile memory module 123. In other words, data to be written to the rewritable non-volatile memory module 123 is converted into a format that may be accepted by the rewritable non-volatile memory module 123 through the memory interface 22.

The memory management circuit 23 is used to control an overall operation of the memory control circuit unit 122. To be specific, the memory management circuit 23 has a plurality of control commands, and when the memory storage apparatus 12 operates, the control commands are executed to perform operations such as data writing, reading, and erasing. In addition, the memory management circuit 23 may also include one or a plurality of buffer memories for temporarily storing data.

In addition, the memory management circuit 23 may allocate a plurality of logical units to the rewritable non-volatile memory module 123 to map the physical addresses, and record a mapping relationship (which is also referred to as a logical-physical address mapping relationship) between the logical units and the physical addresses in at least one logical-to-physical address mapping table. When the host system 11 is about to read data from the memory storage apparatus 12 or write data to the memory storage apparatus 12, the memory management circuit 23 may execute the data access operation to the memory storage apparatus 12 according to the logic-to-physical address mapping table.

In the exemplary embodiment, the control commands of the memory management circuit 23 are implemented in form of firmware. For example, the memory management circuit 23 has a microprocessor unit (not shown) and a read-only memory (not shown), and the control commands are burned into the read-only memory. When the memory storage apparatus 12 operates, the control commands are executed by the microprocessor unit to perform data writing, reading, and erasing operations.

In another exemplary embodiment of the invention, the control commands of the memory management circuit 23 may also be stored in a specific region of the rewritable non-volatile memory module 123 (for example, a system region in the memory module dedicated to store system data). In addition, the memory management circuit 23 has a microprocessor unit (not shown), a read-only memory (not shown), and a random access memory (not shown). In particular, the read-only memory has a driving code, and when the memory control circuit unit 123 is enabled, the microprocessor unit may first execute the driving code to load the control commands stored in the rewritable non-volatile memory module 123 into the random access memory of the memory management circuit 23. Thereafter, the microprocessor unit executes these control commands to perform data writing, reading, and erasing operations.

In addition, in another exemplary embodiment of the invention, the control commands of the memory management circuit 23 may also be implemented in form of hardware. For example, the memory management circuit 23 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit and the data processing circuit are coupled to the microcontroller. The memory cell management circuit is used to manage the physical erasing units of the rewritable non-volatile memory module 123; the memory writing circuit is used to issue a writing command to the rewritable non-volatile memory module 123 to write data into the rewritable non-volatile memory module 123; the memory reading circuit is used to issue a reading command to the rewritable non-volatile memory module 123 to read data from the rewritable non-volatile memory module 123; the memory erasing circuit is used to issue an erasing command to the rewritable non-volatile memory module 123 to erase data from the rewritable non-volatile memory module 123; and the data processing circuit is used to process data to be written to the rewritable non-volatile memory module 123 and data read from the rewritable non-volatile memory module 123.

In the following exemplary embodiments, the operations performed by the host interface 21, the memory interface 22, and the memory management circuit 23 may also be referred to as being performed by the memory control circuit unit 122.

Figure 3:
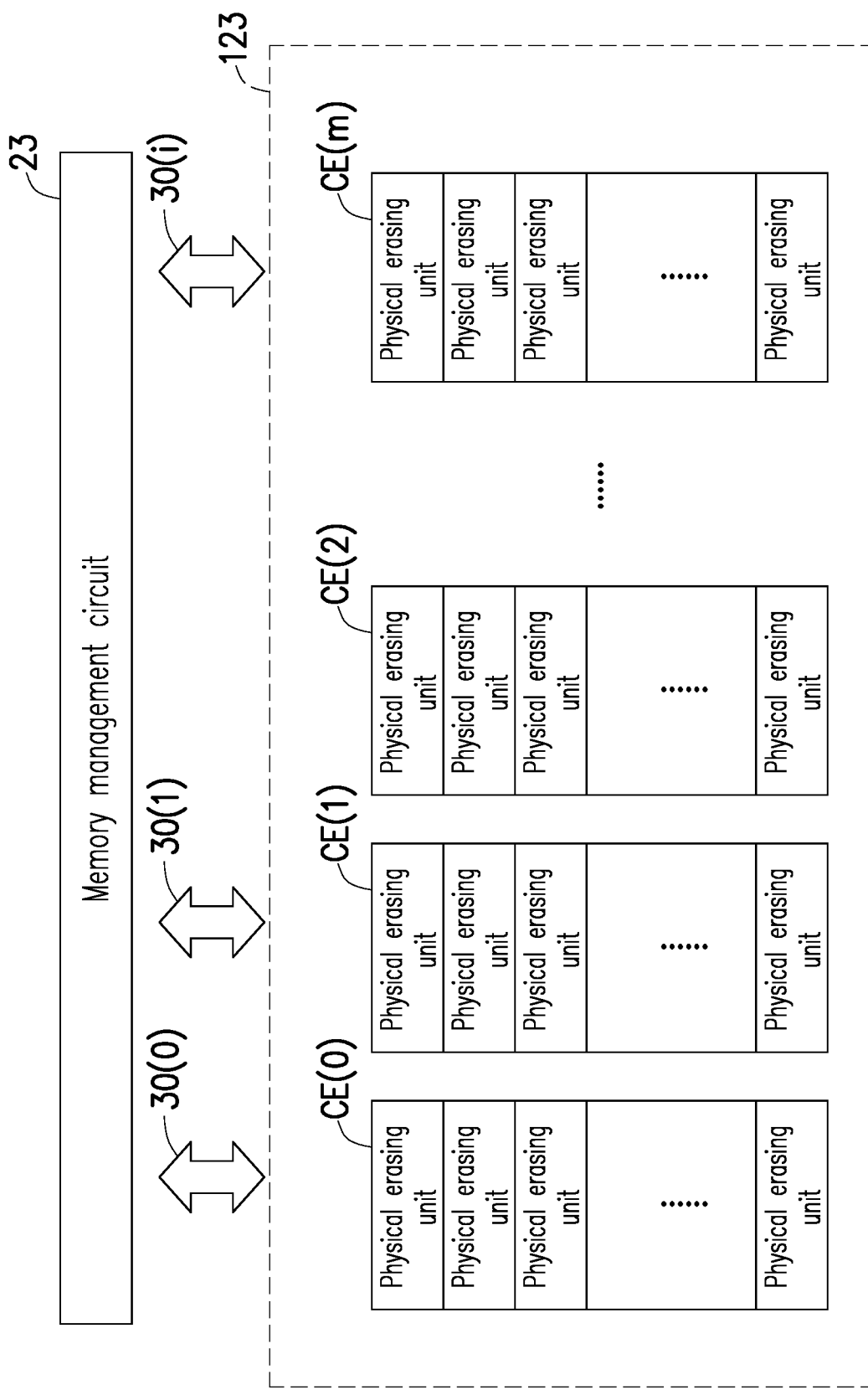
FIG. 3 is a schematic diagram illustrating an example of a memory storage apparatus according to an embodiment of the invention.

FIG. 3 is a schematic diagram illustrating an example of a memory storage apparatus according to an embodiment of the invention.

It should be noted that when describing the operation of the physical erasing units of the rewritable non-volatile memory module 123, to use words such as "grouping", "composition", "reorganization", and "remapping", etc., to operate the physical erasing units is a logical concept. In other words, an actual location of the physical erasing units of the rewritable non-volatile memory module is not changed, but the physical erasing units of the rewritable non-volatile memory module are logically operated.

Referring to FIG. 3, the rewritable non-volatile memory module 123 may include a plurality of chip enables (CE) (which are also referred to as chip enable groups) CE(0)-CE(m). Each chip enable may include one or a plurality of memory dies or planes, and each plane includes a plurality of physical erasing units. In other words, each of the plurality of physical erasing units corresponds to one chip enable group. The memory storage apparatus 12 may include a plurality of channels 30(0)-30(i), and each channel may be connected to a plurality of chip enables. In other words, multiple chip enables may share one channel, and each chip enable uses an associated channel to communicate with the memory management circuit 23. The memory management circuit 23 may drive one of the channels 30(0)-30(i) to read data from specified chip enables CE(0)-CE(m). Each of the chip enables CE(0)-CE(m) has an independent chip enable (CE) control signal. For example, when data reading is to be performed on a specified chip enable CE(0), the associated channel is required to be driven to enable the chip enable control signal of the chip enable CE(0), and data is read from a specified position of the chip enable CE(0) through a data line.

Each chip enable group has M physical erasing units corresponding to M virtual blocks (Virtual Block, VB) arranged according to an order (which is also referred to as a first order), where M is an integer greater than 0. For example, FIG. 4 is a schematic diagram illustrating an example of managing virtual blocks according to an embodiment of the invention. Referring to FIG. 4, for the convenience of description, it is assumed that the rewritable non-volatile memory module 123 includes chip enables CE(0)-CE(7), and each chip enable includes 11 physical erasing units (i.e., it is assumed that M is 11). In this exemplary embodiment, the plurality of physical erasing units belonging to different chip enables may form one virtual block. For example, a physical erasing unit 410(0), a physical erasing unit 420(0), a physical erasing unit 430(0), a physical erasing unit 440(0), a physical erasing unit 450(0), a physical erasing unit 460(0), a physical erasing unit 470(0), and a physical erasing unit 480(0) (which are referred to as the physical erasing units 410(0)-480(0) hereinafter) may form a virtual block VB0. Similarly, the physical erasing units 410(1)-480(1), 410(2)-480(2), 410(3)-480(3), 410(4)-480(4), 410(5)-480(5), 410(6)-480(6), 410(7)-480(7), 410(8)-480(8), 410(9)-480(9), 410(10)-480(10) may respectively form virtual blocks VB1, VB2, VB3, VB4, VB5, VB6, VB7, VB8, VB9, VB10. Deduced by analogy, different numbers of virtual blocks may be formed according to the number of the physical erasing units included in each chip enable, which is not limited by the invention. In other words, in the embodiment of FIG. 4, it is assumed that the physical erasing units constitute 11 virtual blocks VB0-B10.

In the embodiment, the memory management circuit 23 sequentially writes data according to an order of the virtual blocks. For example, it is assumed that all of the virtual blocks are blank, when a batch of write data that may fill 10 physical erasing units is to be written, the memory management circuit 23 may store the write data to the physical erasing units 410(0)-480(0) of the first empty virtual block VB0 according to the first order, and store the remained write data to the physical erasing units 410(1)-420(1) of the second blank virtual block VB1.

In an embodiment, if all of the physical erasing units respectively corresponding to all of the planes in the virtual block to be written may all be used to store data (for example, blank), the memory management circuit 23 may use a multiple plane write mode to store the write data to the virtual block. The multi plane write mode may also be referred to as a full plane write mode. Conversely, if one or a plurality of physical erasing units in all of the physical erasing units respectively corresponding to all of the planes in the virtual block to be written cannot be used to store data (for example, the physical erasing units are damaged or have stored data), the memory management circuit 23 may use a single plane write mode to store the write data to the virtual block. However, the invention does not limit the writing mode here.

In one embodiment, the memory management circuit 23 maintains specific management information (which is also referred to as first management information) in the rewritable non-volatile memory module 123. For example, the first management information may be stored in the rewritable non-volatile memory module 123. In the embodiment, the first management information is, for example, a look-up table, which record a valid count of each of the plurality of physical erasing units.

FIG. 5A is a schematic diagram illustrating an example of managing virtual blocks according to an embodiment of the invention. For example, FIG. 5A is a simplified diagram corresponding to the rewritable non-volatile memory module 123 of FIG. 4, and following Table 1 is the first management information corresponding to FIG. 5A. Referring to FIG. 5A and following Table 1, the valid count of the physical erasing unit 410(0) in FIG. 5A is recorded in a field corresponding to the chip enable CE(0) and the virtual block VB0 in Table 1, i.e., the valid count is 5325. Deduced by analogy, the valid count of each physical erasing unit may be obtained by referring to FIG. 5A and following Table 1. In this way, the memory management circuit 23 may obtain the valid counts of the physical erasing units according to the first management information.

TABLE 1

|      | CE(0) | CE(1) | CE(2) | CE(3) | CE(4) | CE(5) | CE(6) | CE(7) |
|------|-------|-------|-------|-------|-------|-------|-------|-------|
| VB0  | 5325  | 6106  | 5693  | 3780  | 5881  | 1341  | 2508  | 1925  |
| VB1  | 5488  | 1277  | 4297  | 1501  | 4827  | 4075  | 5657  | 3786  |
| VB2  | 405   | 4543  | 2981  | 4684  | 793   | 2379  | 3617  | 2353  |
| VB3  | 5446  | 1151  | 1826  | 1527  | 775   | 216   | 4679  | 649   |
| VB4  | 294   | 4794  | 5869  | 3799  | 2680  | 340   | 5686  | 3775  |
| VB5  | 2752  | 3600  | 23    | 2589  | 3249  | 1471  | 455   | 625   |
| VB6  | 5612  | 741   | 195   | 5431  | 2706  | 5076  | 2619  | 3334  |
| VB7  | 1097  | 2590  | 5758  | 616   | 398   | 1904  | 4451  | 5155  |
| VB8  | 3982  | 4493  | 458   | 5360  | 1984  | 5720  | 1808  | 3836  |
| VB9  | 5193  | 5222  | 1169  | 444   | 1634  | 6077  | 2304  | 1698  |
| VB10 | 396   | 5530  | 5468  | 200   | 2576  | 2784  | 2650  | 175   |

In the exemplary embodiment, the memory management circuit 23 is used to remap the physical erasing units included in each virtual block according to the valid count of each of the physical erasing units (for example, the virtual block remapping operation described below), so as to reorganize the physical erasing units with smaller valid counts into a same virtual block.

To be specific, the memory management circuit 23 sequentially arranges the physical erasing units corresponding to each chip enable group according to the valid counts of the physical erasing units to form a plurality of sorted physical erasing units. For example, the memory management circuit 23 may sort the physical erasing units corresponding to each chip enable group according to the valid counts in an ascending order to form a plurality of sorted physical erasing units. Alternatively, the memory management circuit 23 may also sort the physical erasing units corresponding to each chip enable group according to the valid counts in a descending order to form the plurality of sorted physical erasing units, the sorting method is not limited by the invention.

The memory management circuit 23 may, for example, sort the valid counts in Table 1 in the ascending order, and arrange the physical erasing units corresponding to each chip enable group in an order of the valid counts after sorting to form sorted physical erasing units. Taking the chip enable CE(0) in FIG. 5A as an example, the memory management circuit 23 sorts the valid counts corresponding to the chip enable CE(0) in Table 1 in the ascending order, and the valid counts after sorting are shown in following Table 2. Then, based on an order of the valid counts in following Table 2, the memory management circuit 23 arranges the physical erasing units 410(0)-410(10) corresponding to the chip enable CE(0) according to an arranging order of the valid count corresponding to each physical erasing unit to form sorted M (which is 11 in the embodiment) physical erasing units, and the order from front to back is the sorted physical erasing units 410(4), 410(10), 410(2), 410(7), 410(5), 410(8), 410(9), 410(0), 410(3), 410(1) and 410(6). Deduced by analogy, the memory management circuit 23 sequentially arranges the physical erasing units corresponding to the chip enables CE(1)-CE(7) according to the above-mentioned method.

TABLE 2

|     | CE(0) | CE(1) | CE(2) | CE(3) | CE(4) | CE(5) | CE(6) | CE(7) |
|-----|-------|-------|-------|-------|-------|-------|-------|-------|
| VB0 | 294   | 741   | 23    | 200   | 398   | 216   | 455   | 175   |
| VB1 | 396   | 1151  | 195   | 444   | 775   | 340   | 1808  | 625   |
| VB2 | 405   | 1277  | 458   | 606   | 793   | 1341  | 2304  | 649   |
| VB3 | 1097  | 2590  | 1169  | 1501  | 1634  | 1471  | 2508  | 1698  |
| VB4 | 2752  | 3600  | 1826  | 1527  | 1984  | 1904  | 2619  | 1925  |
| VB5 | 3982  | 4493  | 2981  | 2589  | 2576  | 2379  | 2650  | 2353  |
| VB6 | 5193  | 4543  | 4297  | 3780  | 2680  | 2784  | 3617  | 3334  |
| VB7 | 5325  | 4794  | 5468  | 3799  | 2706  | 4075  | 4451  | 3775  |
| VB8 | 5446  | 5222  | 5693  | 4584  | 3249  | 5076  | 4679  | 3786  |
| VB9 | 5488  | 5530  | 5758  | 5360  | 4827  | 5720  | 5657  | 3836  |
| VB10| 5612  | 6106  | 5869  | 5431  | 5881  | 6077  | 5686  | 5155  |

After forming the sorted physical erasing units, the memory management circuit 23 performs a virtual block remapping operation. In the virtual block remapping operation, the memory management circuit 23 remaps the physical erasing units corresponding to the virtual blocks according to the plurality of sorted physical erasing units. To be specific, when the memory management circuit 23 executes the virtual block remapping operation, it uses physical addresses of the sorted physical erasing units to remap physical addresses of the physical erasing units corresponding to the virtual blocks (the memory management circuit 23 may use a virtual block management table to record such information). Namely, data access operations of the sorted physical erasing units are all converted to data access operations of the remapped physical erasing units.

FIG. 5B is a schematic diagram illustrating an example of a remapping physical erasing units according to an embodiment of the invention. The chip enable CE(0) of FIG. 5A is taken as an example for description. Following the previous embodiment, the order of the sorted physical erasing units corresponding to the chip enable CE(0) from front to back is the sorted physical erasing units 410(4), 410(10), 410(2), 410(7), 410(5), 410(8), 410(9), 410(0), 410(3), 410(1) and 410(6). Accordingly, the memory management circuit 23 remaps the physical addresses of the physical erasing units 410(0)-410(10) according to the sorted physical erasing units (for example, 410(0)→410(4), 410(1)→410(10), 410(3)→410(7), 410(4)→410(5), 410(5)→410(8), 410(6)→410(9), 410(7)→410(0), 410(8)→410(3), 410(9)→410(1), 410(10)→410(6) as shown in FIG. 5B). The memory management circuit 23 may record mapping information corresponding to the physical erasing units 410(0)-410(10) in the virtual block management table, and complete the virtual block remapping operation corresponding to the chip enable CE(0). Deduced by analogy, the memory management circuit 23 completes the virtual block remapping operations of the chip enables CE(1)-CE(7) according to the above-mentioned method.

After completing the virtual block remapping operation, the memory management circuit 23 calculates a total number of valid counts of the remapped virtual blocks, and sequentially arranges the remapped virtual blocks according to the total number of valid counts to form a plurality of sorted virtual blocks. For example, the memory management circuit 23 may sort the remapped virtual blocks in an ascending order according to the total number of valid counts to form the plurality of sorted virtual blocks. Alternatively, the memory management circuit 23 may sort the remapped virtual blocks in a descending order according to the total number of valid counts to form the plurality of sorted virtual blocks, and the sorting method is not limited by the invention.

For example, the valid counts recorded in above Table 2 may correspond to the remapped physical erasure units in FIG. 5B. Referring to FIG. 5B and above Table 2, in FIG. 5B, the physical erasing unit 410(0) is replaced by the physical erasing unit 410(4) (for example, 410(0)→410(4) shown in FIG. 5B), the valid count of the replaced physical erasing unit 410(4) is recorded in a field corresponding to the chip enable CE(0) and the virtual block VB0 in Table 2, i.e., the valid count is 294. Deduced by analogy, the valid count of each physical erasing unit may be obtained by referring to FIG. 5B and above Table 2. In this exemplary embodiment, the memory management circuit 23 may sum up the valid counts of the physical erase units corresponding to each of the remapped virtual block VB0-VB10 to generate the total number of valid counts of each of the remapped virtual block VB0-VB10. For example, the memory management circuit 23 sums up the valid counts of the physical erasing units 410(4), 420(6), 430(5), 440(10), 450(7), 460(3), 470(5) and 480(10) corresponding to the remapped virtual block VB0, and the calculated total number of valid counts is 2502. Deduced by analogy, the memory management circuit 23 may calculate the total number of valid counts of each of the remapped virtual blocks VB1-VB10 (the memory management circuit 23 may use a total number of valid counts management table to record such information). Referring to following Table 3 for the calculated total numbers of valid counts. A left column of Table 3 is the virtual blocks VB0-VB10, and a right column records the total numbers of valid counts corresponding to the virtual blocks VB0-VB10. In this exemplary embodiment, since the physical erasing units corresponding to each chip enable group are arranged in the ascending order when the sorted physical erasing units are formed, the virtual blocks sorted in the ascending order may be formed without further arranging the remapped virtual blocks (i.e., the virtual blocks VB0-VB10 may be regarded as sorted virtual blocks).

TABLE 3

| Virtual block | Total number of valid count |
|---------------|------------------------------|
| VB0           | 2502                         |
| VB1           | 5734                         |
| VB2           | 7843                         |
| VB3           | 13668                        |
| VB4           | 18137                        |
| VB5           | 24003                        |
| VB6           | 30228                        |
| VB7           | 34393                        |
| VB8           | 37835                        |
| VB9           | 42176                        |
| VB10          | 45817                        |

Finally, the memory management circuit 23 sequentially extracts at least one sorted virtual block as a source virtual block to perform a garbage collection operation. For example, the memory management circuit 23 may extract at least one sorted virtual block sorted to the front as the source virtual block to perform the garbage collection operation. Alternatively, the memory management circuit 23 may extract at least one sorted virtual block sorted at the back as the source virtual block to perform the garbage collection operation. The invention does not limit the manner of extracting the sorted virtual blocks.

Referring to above Table 3, the memory management circuit 23 may extract the virtual blocks VB0-VB10 as the source virtual blocks in the descending order of the total numbers of valid counts. For example, the memory management circuit 23 may extract the sorted virtual block corresponding to the smallest total number of valid counts from the sorted virtual blocks as the source virtual block. In this way, the memory management circuit 23 may reorganize the physical erasing unit with the smallest valid count in each chip enable group into the same virtual block VB0, and take the reorganized virtual block VB0 in priority as the source virtual block used in the garbage collection operation.

It should be noted that the above method of extracting the sorted virtual blocks is related to an arranging order of the sorted physical erasing units formed by the previous step of arranging the physical erasing units. Contrary to above Table 2, if the memory management circuit 23 sorts the valid counts corresponding to the chip enables in above Table 1 in the descending order when forming the sorted physical erasing units, the remapped virtual blocks may form the sorted virtual blocks with the total numbers of valid counts being sorted in the descending order. In this embodiment, the memory management circuit 23 may extract at least one sorted virtual block sorted at the back as the source virtual block. Alternatively, the memory management circuit 23 may sequentially arrange the remapped virtual blocks according to the total numbers of valid counts to form sorted virtual blocks with the total numbers of valid counts sorted from small to large, and extract at least one sorted virtual block that is sorted to the front as the source virtual block. It should be noted that the invention does not limit the sorting and extracting methods, and those skilled in the art may design various sorting and extracting methods for sorted virtual blocks by themselves based on the instructions of the above exemplary embodiments.

After determining the source virtual block, the memory management circuit 23 performs the garbage collection operation. The memory management circuit 23 selects a virtual block as a target virtual block. Then, valid data in the source virtual block is moved (or copied) to the target virtual block, and the source virtual block is erased to release a space occupied by invalid data of the source virtual block. However, other technical concepts related to the above garbage collection operation are technical means well known to those skilled in the art, and are not repeated.

Figure 6:
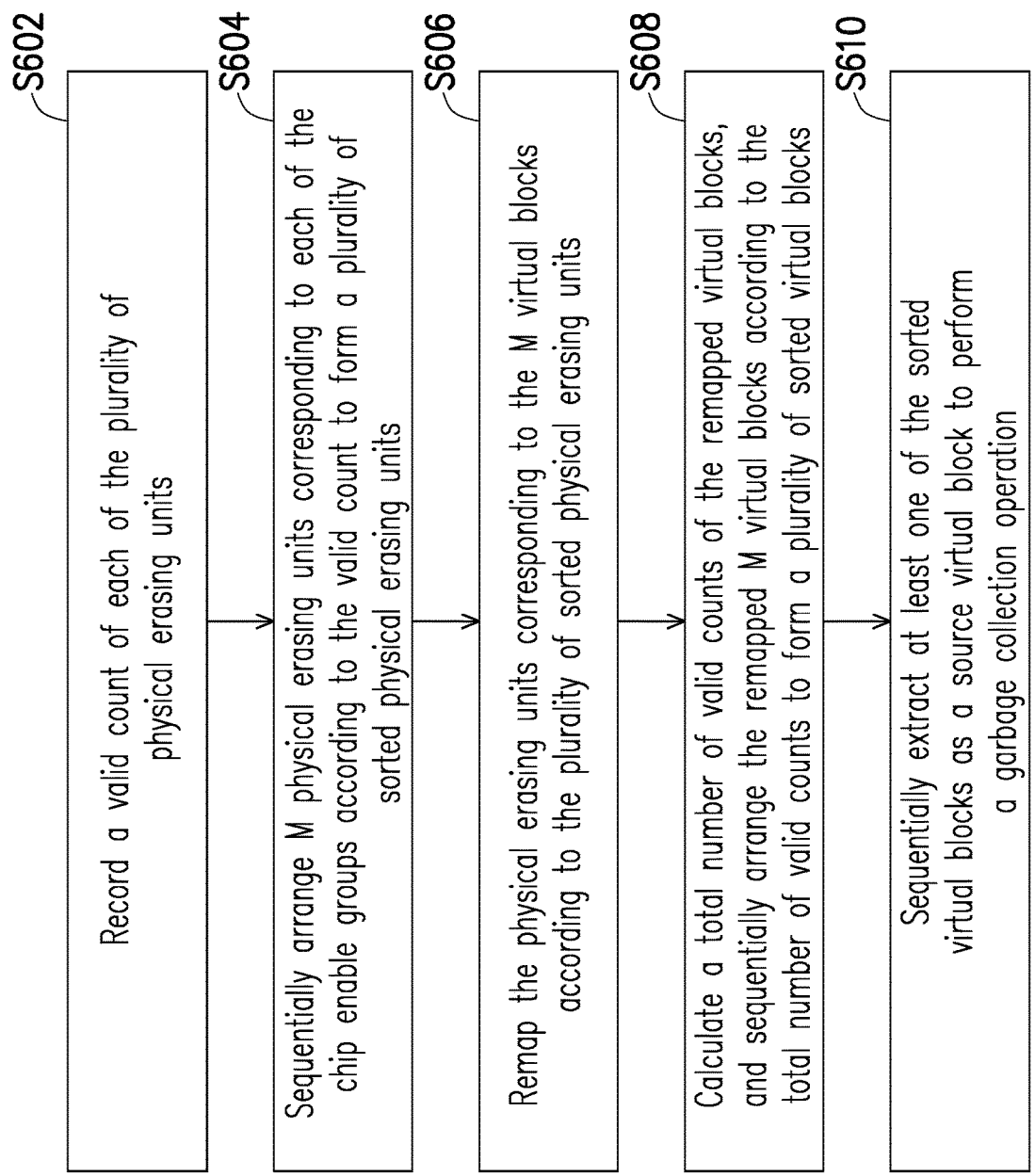
FIG. 6 is a flowchart of a memory management method according to an exemplary embodiment of the invention.

FIG. 6 is a flowchart of a memory management method according to an exemplary embodiment of the invention. Referring to FIG. 6, in step S602, a valid count of each of a plurality of physical erasing units is recorded. In step S604, M physical erasing units corresponding to each of the chip enable groups are sequentially arranged according to the valid count to form a plurality of sorted physical erasing units. In step S606, the physical erasing units corresponding to the M virtual blocks are remapped according to the plurality of sorted physical erasing units. In step S608, a total number of valid counts of the remapped M virtual blocks is calculated, and the remapped M virtual blocks are sequentially arranged according to the total number of valid counts to form a plurality of sorted virtual blocks. In step S610, at least one of the sorted virtual blocks is sequentially extracted as a source virtual block to perform a garbage collection operation.

However, each step in FIG. 6 has been described in detail as above, and detail thereof is not repeated. It should be noted that each step in FIG. 6 may be implemented as multiple program codes or circuits, which is not limited by the invention. In addition, the method in FIG. 6 may be used in collaboration with the above exemplary embodiments, or may be used independently, which is not limited by the invention.

In summary, the memory management method, the memory control circuit unit and the memory storage apparatus of the embodiments of the invention may reorganize the virtual blocks according to the valid count of each physical erasing unit. For example, the physical erasing unit with the smallest valid count in each chip enable group may be reorganized to a same virtual block. Besides, the embodiment of the invention may preferentially use the virtual block with the smallest total number of valid count as the source virtual block used in the garbage collection operation. In this way, the efficiency of garbage collection operation is improved and the number of times of the garbage collection operations may be reduced, thereby improving a sustained performance of the memory.

What is claimed is:

1. A memory management method, adapted to a rewritable non-volatile memory module comprising a plurality of physical erasing units, wherein each of the plurality of physical erasing units corresponds to one of a plurality of chip enabled groups and one of a plurality of virtual blocks, the memory management method comprising:
   recording a valid count of each of the plurality of physical erasing units;
   before a source virtual block for garbage collection is determined, changing a mapping relationship between at least one of the physical erasing units and at least one of the virtual blocks according to the valid count to form a plurality of remapped virtual blocks;
   calculating a total number of valid counts of the remapped virtual blocks; and
   after the remapped virtual blocks are obtained, selecting at least one of the remapped virtual blocks as the source virtual block to perform a garbage collection operation according to the total number.

2. The memory management method as claimed in claim 1, wherein the step of changing the mapping relationship between the at least one of the physical erasing units and the at least one of the virtual blocks according to the valid count to form the remapped virtual blocks comprises:
   changing an original mapping relationship between a first physical erasing unit among the physical erasing units and a first virtual blocks among the virtual blocks to be a new mapping relationship between the first physical erasing unit and one of the remapped virtual blocks.

3. The memory management method as claimed in claim 1, further comprises:
   sorting the remapped virtual blocks in an ascending order according to the total number of valid counts.

4. The memory management method as claimed in claim 3, wherein the step of selecting the at least one of the remapped virtual blocks as the source virtual block to perform the garbage collection operation according to the total number comprises:

selecting, according to a sorting result, the at least one of the remapped virtual blocks as the source virtual block to perform the garbage collection operation.

5. The memory management method as claimed in claim 1, wherein the step of selecting the at least one of the remapped virtual blocks as the source virtual block to perform the garbage collection operation according to the total number comprises:

selecting the at least one of the remapped virtual blocks corresponding to a smallest total number of valid counts as the source virtual block.

6. The memory management method as claimed in claim 1, wherein the step of performing the garbage collection operation comprises:

copying valid data in the source virtual block to a target virtual block, and erasing the source virtual block.

7. A memory control circuit unit, adapted to control a rewritable non-volatile memory module comprising a plurality of physical erasing units, wherein each of the plurality of physical erasing units corresponds to one of a plurality of chip enabled groups and one of a plurality of virtual blocks, the memory control circuit unit comprising:

a host interface, coupled to a host system;

a memory interface, coupled to the rewritable non-volatile memory module; and a memory management circuit, coupled to the host interface and the memory interface, wherein the memory management circuit is configured to record a valid count of each of the plurality of physical erasing units, the memory management circuit is further configured to, before a source virtual block for garbage collection is determined, change a mapping relationship between at least one of the physical erasing units and at least one of the virtual blocks according to the valid count to form a plurality of remapped virtual blocks, the memory management circuit is further configured to calculate a total number of valid counts of the remapped virtual blocks, and the memory management circuit is further configured to, after the remapped virtual blocks are obtained, select at least one of the remapped virtual blocks as the source virtual block to perform a garbage collection operation according to the total number.

8. The memory control circuit unit as claimed in claim 7, wherein the operation of changing the mapping relationship between the at least one of the physical erasing units and the at least one of the virtual blocks according to the valid count to form the remapped virtual blocks comprises:

changing an original mapping relationship between a first physical erasing unit among the physical erasing units and a first virtual blocks among the virtual blocks to be a new mapping relationship between the first physical erasing unit and one of the remapped virtual blocks.

9. The memory control circuit unit as claimed in claim 7, wherein the memory management circuit is further configured to:

sort the remapped virtual blocks in an ascending order according to the total number of valid counts to form the plurality of sorted virtual blocks.

10. The memory control circuit unit as claimed in claim 9, wherein the operation of selecting the at least one of the remapped virtual blocks as the source virtual block to perform the garbage collection operation according to the total number comprises:

selecting, according to a sorting result, the at least one of the remapped virtual blocks as the source virtual block to perform the garbage collection operation.

11. The memory control circuit unit as claimed in claim 7, wherein the operation of selecting the at least one of the remapped virtual blocks as the source virtual block to perform the garbage collection operation according to the total number comprises:

selecting the at least one of the remapped virtual blocks corresponding to a smallest total number of valid counts as the source virtual block.

12. The memory control circuit unit as claimed in claim 7, wherein the operation of performing the garbage collection operation comprises:

copying valid data in the source virtual block to a target virtual block, and erasing the source virtual block.

13. A memory storage apparatus, comprising:

a connection interface unit, coupled to a host system;

a rewritable non-volatile memory module, comprising a plurality of physical erasing units, wherein each of the plurality of physical erasing units corresponds to one of a plurality of chip enabled groups and one of a plurality of virtual blocks; and a memory control circuit unit, coupled to the connection interface unit and the rewritable non-volatile memory module, wherein the memory control circuit unit is configured to record a valid count of each of the plurality of physical erasing units, the memory control circuit unit is further configured to, before a source virtual block for garbage collection is determined, change a mapping relationship between at least one of the physical erasing units and at least one of the virtual blocks according to the valid count to form a plurality of remapped virtual blocks, the memory control circuit unit is further configured to calculate a total number of valid counts of the remapped virtual blocks, and the memory control circuit unit is further configured to, after the remapped virtual blocks are obtained, select at least one of the remapped virtual blocks as the source virtual block to perform a garbage collection operation according to the total number.

14. The memory storage apparatus as claimed in claim 13, wherein the operation of changing the mapping relationship between the at least one of the physical erasing units and the at least one of the virtual blocks according to the valid count to form the remapped virtual blocks comprises:

changing an original mapping relationship between a first physical erasing unit among the physical erasing units and a first virtual blocks among the virtual blocks to be a new mapping relationship between the first physical erasing unit and one of the remapped virtual blocks.

15. The memory storage apparatus as claimed in claim 13, wherein the memory control circuit unit is further configured to:

sort the remapped virtual blocks in an ascending order according to the total number of valid counts to form the plurality of sorted virtual blocks.

16. The memory storage apparatus as claimed in claim 15, wherein the operation of selecting the at least one of the remapped virtual blocks as the source virtual block to perform the garbage collection operation according to the total number comprises:

selecting, according to a sorting result, the at least one of the remapped virtual blocks as the source virtual block to perform the garbage collection operation.

17. The memory storage apparatus as claimed in claim 13, wherein the operation of selecting the at least one of the remapped virtual blocks as the source virtual block to perform the garbage collection operation according to the total number comprises:
selecting the at least one of the remapped virtual blocks corresponding to a smallest total number of valid counts from the at least one of the sorted virtual blocks as the source virtual block.

18. The memory storage apparatus as claimed in claim 13, wherein the operation of performing the garbage collection operation comprises:
copying valid data in the source virtual block to a target virtual block, and erasing the source virtual block.

* * * * *